United States Patent [19]

Billon

[11] Patent Number: 4,661,449

[45] Date of Patent: Apr. 28, 1987

[54] PROCESS AND INSTALLATION FOR THE PREPARATION OF A SWEET WORT

[75] Inventor: Michel Billon, Unieux, France

[73] Assignee: Clextral, Paris, France

[21] Appl. No.: 634,714

[22] Filed: Jul. 26, 1984

[30] Foreign Application Priority Data

Jul. 28, 1983 [FR] France .................. 83 12475

[51] Int. Cl.⁴ .................. C12C 1/00; C12C 7/04; C12C 7/06; C12M 1/10
[52] U.S. Cl. .................. 435/93; 435/312; 99/278
[58] Field of Search .................. 435/93, 162, 161, 302, 435/305, 306, 312; 426/29, 13, 16, 447-449, 507, 508; 99/278, 348

[56] References Cited

U.S. PATENT DOCUMENTS

| | | | |
|---|---|---|---|
| 2,343,706 | 3/1944 | Reich | 435/93 |
| 4,286,058 | 8/1981 | Wenger et al. | 435/99 |
| 4,306,023 | 12/1981 | Crombie | 435/93 X |
| 4,361,081 | 11/1982 | Howard | 99/348 |

FOREIGN PATENT DOCUMENTS

| | | | |
|---|---|---|---|
| 3212390 | 6/1983 | Fed. Rep. of Germany | 435/93 |
| 932824 | 6/1983 | U.S.S.R. | 435/29 |

*Primary Examiner*—Lionel M. Shapiro
*Attorney, Agent, or Firm*—Pollock, Vande Sande & Priddy

[57] ABSTRACT

Process for the preparation of a sweet wort from a cereal, in which previously mashed cereal flour is mixed with a hydrolyzing substance introducing enzymes to undergo a saccharification treatment. Before mashing, the cereal flour is subjected to a cooking-extrusion at a temperature above 100° C., by passage continuously in a screw-extrusion machine provided with heating means. The amount of water can be limited to that necessary for the bursting of the starch grain. The extruded cereal is then mashed and mixed with the hydrolyzing substance to undergo saccharification, and the latter can then be effected by infusion. The invention is especially applicable to the preparation of beer or of alcoholic beverages by fermentation of the sweet wort obtained.

13 Claims, 4 Drawing Figures

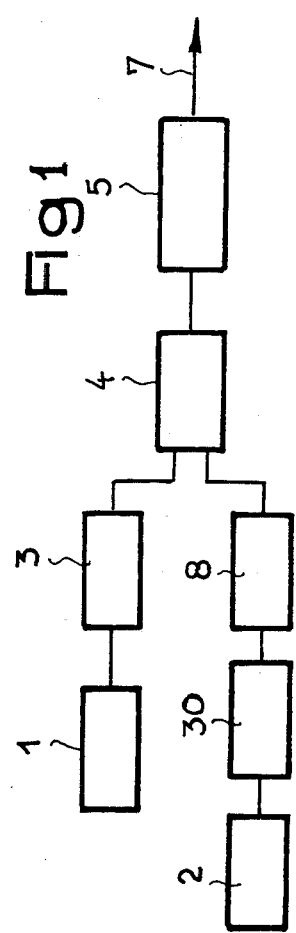
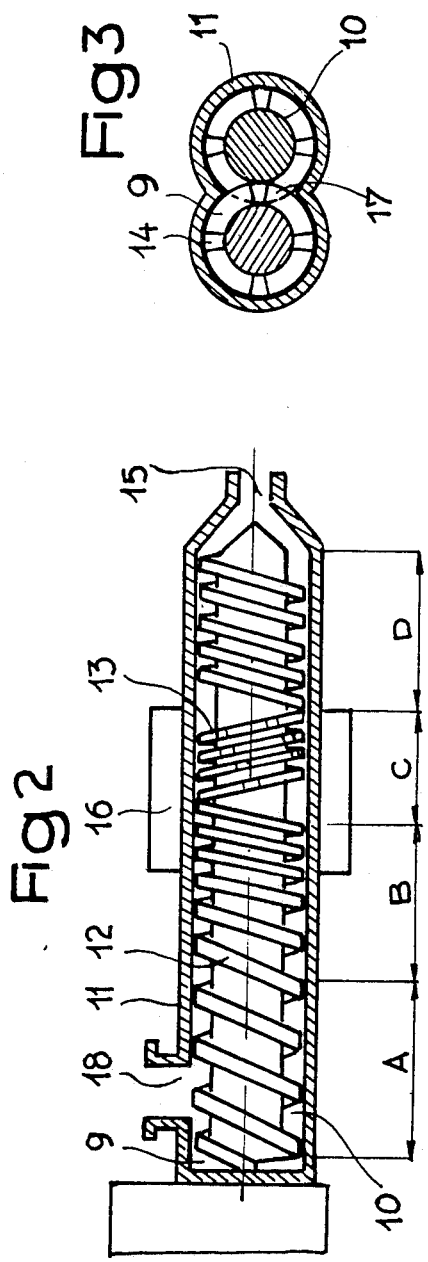

PROCESS AND INSTALLATION FOR THE PREPARATION OF A SWEET WORT

FIELD OF THE INVENTION

The invention relates to a process and an installation for the preparation of a sweet wort (or must wort) from cereal, particularly for the preparation of a beer or a similar beverage.

It is known that, to manufacture beer, melt, i.e., germinated barley, is used, from which a sweet wort is prepared in a so-called brewing treatment; this must is then subjected to a fermentation operation in the presence of yeast to obtain an alcoholic beverage. The malt is first crushed in a mill and the flour obtained mixed with water in a device called "pre-masher" (or converter), for the mashing operation.

BACKGROUND OF THE INVENTION

In the so-called "by infusion" process, the mash mixture is then sent into a saccharification device normally constituted by a vat called a mush-tub in which the temperature is raised in steps to produce thhe saccharification of the starch, i.e., its conversion into dextrin and into maltose under the influence of the enzymes of the malt.

In the process called "extract decoction", a portion of the mixture is heated separately in a tank called a "mash copper" and then brought back into the mash-tub whose temperature rises. The same operation is repeated two or three times to bring the mixture in the mash-tub to a temperature of 70° to 75° C., the saccharification process thus occurring progressively.

The must wort thus obtained when undergoes successive operations of filtration, cooking and hopping before fermentation, it is unnecessary to describe these in detail.

In certain countries, the beer must be manufactured solely from barely malt. However, it is possible to replace a portion of the malt by a substitution product of which the saccharification is ensured, after mashing, by the enzymes of the malt. This substitution product, often called "unmalted grain" or "raw grain", may be constituted by a cereal such as broken rice or corn grits.

In this case, parallel with the line of preparation of the malt, there is placed a line of preparation of the raw grain which, at the outlet from the silos, comprises a crusher, a pre-masher which can be constituted by the converter used for the mashing of the malt, and a "mash copper". In fact, before using subjected to the action of the malt in the saccharification operation, the raw grain must be cooked separately to effect the thickening of the starch that it contains. This is why the brewing process by decoction described above for the malt is used.

The crude grain, previously mashed in the converter, is mixed in the mash copper with warm water and with a portion of the contents of the mash-tub which contributes the hydrolyzing enzymes. The mash of raw grain thus prepared then undergoes boiling, which effects the bursting of the starch particles, and it is then brought back into the mash-tub whose temperature is increased on each addition of a mash and whence the saccharification is produced on contact with the rest of the malt.

Local legislation can limit the proportion of crude grain used for the manufacture of the beer. Thus, in France, this proportion is limited to 30%. However, even in countries where the legislation does not impose a maximum percentage of raw grain, a proportion of 45% cannot generally be exceeded for the manufacture of a correct beer based on malt since, beyond this proportion, the saccharification of the starch does not occur under good conditions.

On the other hand, when rice is used, it is observed that certain qualities of rice produced at present thicken poorly, which increases the content of malt that must be used.

SUMMARY OF THE INVENTION

It is an object of the invention to provide a process which is more economical for the preparation of sweet worts, enabling particularly an increase in the proportion of raw grain and hence a reduction in the proportion of malt to be used for the preparation of an alcohol beverage of good quality.

In addition, the invention offers advantages in cases where industrial enzymes are used as hydrolyzing substance in place of malt, for the preparation of a sweet must which can serve for the manufacture of alcoholic beverages.

Other advantages of the invention will appear in the course of the description which follows.

According to the invention, the cereal is subjected, before mashing, to a cooking-extrusion treatment carried out at a temperature above 100° C., by continuous passage of the cereal with an amount of water which can be reduced to that necessary for the bursting of the starch grains, in a screw extrusion machine provided with means for heating the material, the extruded cereal then being mashed, and then subjected to a saccharification treatment carried out in a single step by progressive heating in the presence of the hydrolyzing substance, until the sweet must is obtained.

According to an essential feature, in the case where the hydrolyzing substance is malt, the proportion of malt necessary can drop to about 40%, and saccharification of the extruded cereal can be carried out in one hour at a maximum.

According to another important feature, after extrusion, the mashing of the cereal and of the must wort in a single converter supplied simultaneously and in pre-determined proportions, with the malt flour and the extruded cereal, is effected, the prepared paste then undergoing the saccharification treatment.

The invention also covers an improved installation for the preparation of sweet wort, comprising means for crushing the malt and if necessary the cereal, at least one mashing device for the malt flour and the cereal, and a device for the saccharification of the malt and cooked cereal.

According to the invention, the installation comprises a cooking-extrusion device for the cereal, placed upstream of the mashing device and constituted by a screw extrusion machine provided with heating means, in which the cereal undergoes the cooking-extrusion under pressure at a temperature above 100° C.

According to an advantageous feature, the mashing device is supplied simultaneously with pre-determined proportions of malt flour and extruded cereal for the direct production of a mixed paste which can then undergo the saccharification treatment.

In a preferred embodiment, the extrusion machine comprises at least two screws provided with threads of varied pitch determining, in the direction of advance of the material, a zone of transport and progressive compression of the cereal and a retarding zone with compression and intense mixing in which the bursting of the starch grains is effected, the casing being provided with heating means over the retarding zone and over at least the downstream portion of the transport zone.

BRIEF DESCRIPTION OF THE DRAWINGS

The invention will be better understood from the detailed description of a particular embodiment which follows, given purely by way of illustrative example and shown in the accompanying drawings, in which FIG. 1 is a general block diagram of an installation for practising the process according to the invention;

FIG. 2 shows an axial section of an extrusion machine;

FIG. 3 is a cross-sectional view of the extrusion machine of FIG. 2; and

DETAILED DESCRIPTION

Figure 4:
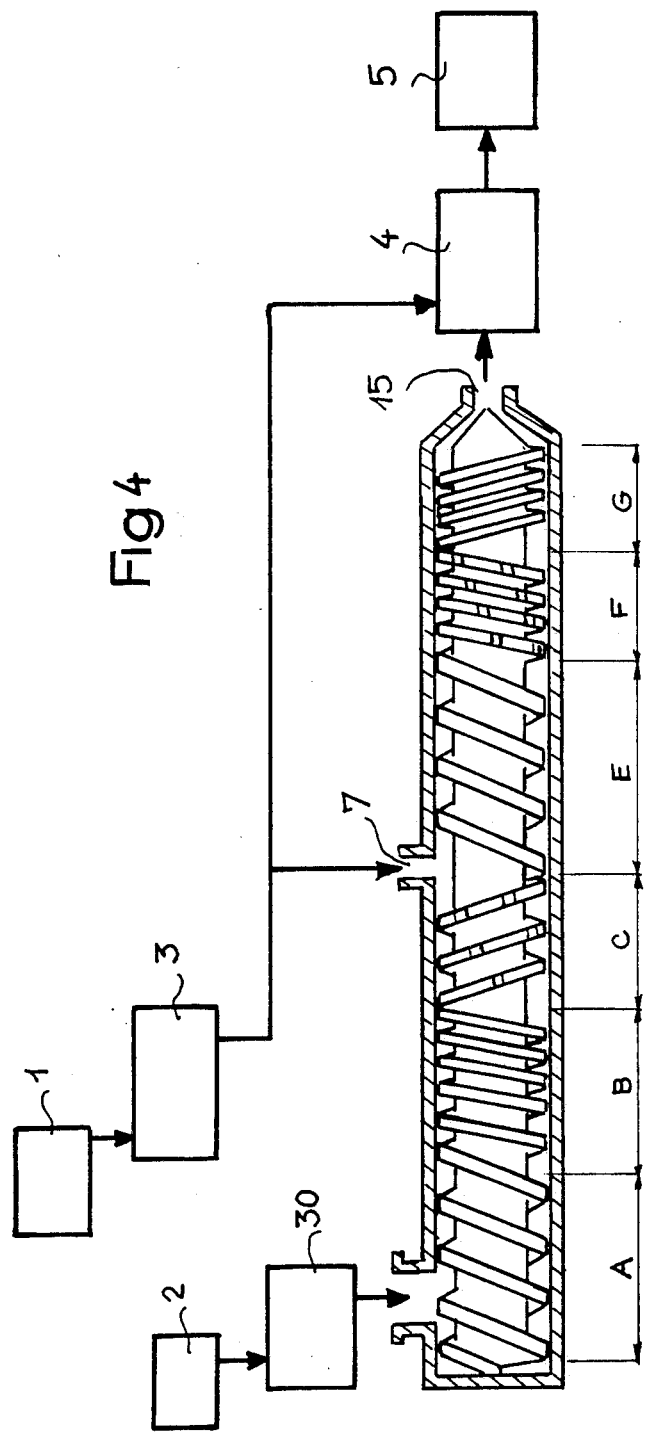
FIG. 4 is a general block diagram with an axial section of an extrusion machine showing another embodiment according to the invention.

FIG. 1 shows diagrammatically the whole of an installation for the preparation of sweet wort from malt and substituent cereal stored respectively in silos 1 and 2.

The installation comprises two lines of preparation, respectively for the malt and for a substitute cereal, called "raw grain".

The malt coming from the silo 1 passes first into a crusher 3 and then into a mashing device, or "converter" 4 in which, by mixing the malt flour with a certain amount of water, a paste is prepared which is sent into a mash tub 5.

The raw grain, for example broken rice, passes also, to the outlet of the silo 2, into a crusher 30.

According to an essential feature of the invention, the crusher 30 can supply directly an extrusion machine 8 in which the cooking-extrusion of the cereal flour is effected continuously.

The extrusion machine 8, shown in more detail in FIGS. 2 and 3, preferably comprises two screws 9 and 10 rotated within a casing 11 which encloses them. The two screws 9 and 10 are provided with identical meshing threads and are rotated in the same direction.

As is shown in FIG. 2, the threads have varied pitches which define several successive zones from the forward parts to downstream in the direction of advance of the material.

Thus there is to be distinguished a zone A with a wide pitch which can draw downstream (towards the right in the figure) the material introduced through an orifice 18 placed at the upstream end of the casing 11.

The pitch of the threads 12 then becomes narrower little by little in a zone B of progressive compression which precedes a retarding zone C in which, preferably, the threads 13 have a reverse pitch and are provided with radial apertures 14 (FIG. 3) whose number and width are determined so as to permit the passage downstream of a limited flow rate of material. As a result, in the zone C a retarding of the advance of the material and consequently a compression in zone B occurs.

The retarding zone C is normally followed by a further transport zone D in which the material remains compressed up to the outlet from the casing, which can be constituted either by a single die or, preferably, by two dies 15 each located in the axis of a screw.

Along the casing are placed heating means 16 which extend over the retarding zone C and at least over the downstream portion of the transport zone D.

The cereal flour emerging from the crusher 6 is introduced through the orifice 18 at the upstream end of the extruder with a certain amount of water which can be fairly small, for example 5% by weight, the amount of water necessary being contributable by the constituent water of the grain. It is known that, in extruders with several screws, the material can be drawn along even when the threads are not filled. In view of this fact, the flour is mixed with the water in the transport zone A and thus forms a paste which is little by little compressed in the zone B with the narrower pitch. The threads are progressively filled and drive in rotation, on their periphery, the paste which passes from one screw to the other in the zone 17, in which the meshing of the threads reduces the passage cross-section and determines an increase in pressure and an increased shearing effect. The temperature rises under the effect of the friction and, optionally, from the heating of the casing by the means 16. Thus, even in the presence of a reduced amount of water, the material forms at the end of the narrowed zone B a viscous paste which passes into the retarding zone C provided for this purpose with reverse pitch threads in which are formed the apertures 14 which extend between the rotary shaft and the periphery of the thread. These apertures are placed in equal number on the screws and the latter are set so that, periodically, two apertures arrive in coincidence in the meshing zone 17. Thus a portion of the paste compressed inside the thread can pass into the succeeding thread through the axial orifice so constituted and which is periodically opened. Inside the zone C, the paste is thus subjected to an intense mixing by the combined effect of compression and shearing. Moreover, under the effect of the friction and of the heating means 16, which permit regulation of the temperature to be ensured, the latter can be maintained between 130° and 150° C. up to the outlet of the retarding zone C. As a result, there is a physical conversion of the starch which permits the bursting of the grains of the latter to be produced, the homogeneity of the paste being ensured by the passage in the outlet zone D and by the extrusion in the dies 15 which causes an additional laminating effect.

Thus there is obtained at the outlet 15 of the extruder 8 a pre-gelled product which is introduced into a mashing device, which may be the converter 4 used also for the mashing of the malt flour. This product can be relatively dry since the amount of water introduced into the extruder can be reduced to that just necessary for the bursting of the grains. Experience has shown that it suffices to add a little water at the starting up of the extruder, for example 5%, the constituent water of the cereal being possibly sufficient for the continuation of the cooking-extrusion.

After meshing, the extruded raw grain is mixed in the desired proportion in the mash tub 5 with the mashed malt to undergo therein the saccharification treatment with a progressive rise in temperature until total conversion of the starch and the production, in good yield, of a sweet wort enabling the preparation, by fermentation, of an alcoholic beverage.

Thus, the cooking-extrusion of the raw grain before mashing renders possible the subsequent conversion of its starch by the malt enzymes, in an infusion process, whereas, until now, the raw grain had to be subjected to the decoction process, more complicated to put into practice.

On the other hand, according to a particularly advantageous feature, a single converter 4 may be placed directly at the outlet of the crusher 3 and of the extruder 8 to be supplied with pre-determined proportions of malt flour, of extruded raw grain and water added in the necessary amount. In this way, a paste is obtained having the desired malt content and viscosity, which is sent into the mash tub 5 where the saccharification treatment is carried out.

This division of the processing into two steps, one the preparation of a relatively dry pre-gelled product and the other of saccharification in which the necessary amount of water is added, permits the preparation in advance and the storage of the extruded cereal at a place possibly remote from the brewery where only the end of the preparation is carried out.

It has been observed that, from a substitute cereal treated, according to the invention, by cooking-extrusion, it is possible to obtain the saccharification of the must obtained and then its subsequent fermentation using a malt content which can be lowered to about 40% by weight of the dry matter. Thus, by using broken rice, a must with a yield of utlization of the raw grain of 93% has been realized. Unmalted barley in whole grains has also been treated and a must wort obtained having a dry extract higher than that which would have been obtained by conventional processing.

In addition, the saccharification treatment can be carried out in at most one hour, i.e., much more rapidly than in the conventional brewing processes of a substitute cereal, taking into account the low proportion of malt necessary.

In a modification, shown in FIG. 4, at least a portion of the malt or other hydrolyzing product is introduced directly into the extruder 8, through an orifice 17 opening into an expansion section E, with a widened pitch. The latter is followed by a further compression section F preceding a second retarding section G with reverse pitch. Hence an intimate mixture of the enzymes thus contributed is produced, with the cereal and a start of saccharification. This relatively fluid mixture is evacuated directly through the die 15 to the mashing device 4 where the rest of the malt necessary for saccharification is added to it in the mash tub 5.

With reference to FIG. 4, the malt introduced through the orifice 17 is preferably dry flour coming from the crusher 8, which facilitates the mixing in the second portion of the extruder.

The process according to the invention hence permits, to the extent allowed by law, an increase in the proportion of malt replaced by a substitute cereal, without changing or with improvement in the brewing yield, which constitutes a considerable economy. In addition, the installation is simplified and its operation facilitated since the processing of the cereal is effected continuously in the extruder and it is possible to regulate possibly inside the same converter the respective proportions of malt and cooked cereal. The converter 4 can, besides, be constituted by the mash tub 5 in which there is carried out firstly the mashing, and then the saccharification.

In addition, the process has been described essentially in the case of the preparation of a malt base beer since it permits the proportion thereof to be reduced without modifying the quality of the product, but the use of extruded cereal can also be advantageous in the case where the malt is replaced by industrial enzymes. In fact, it is advantageous to replace the mash copper used in the decoction process by an extrusion machine which is less bulky and simpler in use.

Of course, the invention is in no way limited to the details of the embodiments which have just been described and which could be the subject of modifications while remaining within the scope of the claimed protection.

Thus, for example, to a certain extent, the passage of the cereal in the transport and compression zones A and B can effect crushing of the grains. The crushing could then be less intense in the crusher 6 and completed in the extruder. In this way, an economy of equipment could be realized. However, even in the case where a cereal flour is used, it may be advantageous to introduce into the extruder with this flour a certain proportion of whole cereal. In fact, when the malt is replaced by another cereal and in particular by broken rice, it may lack, in the course of subsequent filtration, a certain amount of cellulose in the draff. By introducing with the cereal flour a certain quantity of whole grain, it would hence be possible to make up the proportion of cellulose in the draff.

I claim:

1. Process for the preparation of a sweet wort from at least one cereal, in which the cereal is first mashed with water then mixed with a hydrolyzing substance introducing enzymes to undergo a saccharification treatment, in which process, the cereal is before mashing subjected to a cooking-extrusion treatment carried out at a temperature above 100° C., by passage continuously of the cereal, with an amount of water sufficient for the bursting of the starch grain, in a screw extrusion machine comprising at least two screws and provided with heating means for the material and wherein the extruded material is then mashed and subjected to a saccharification treatment carried out by a progressive heating in the presence of the hydrolyzing substance, until the production of the sweet wort.

2. Process for the preparation of a wort according to claim 1, wherein the hydrolyzing substance introducing the enzymes is malt, and the proportion of malt necessary can be lowered to about 40% and the saccharification of the extruded cereal can be carried out in one hour at the maximum.

3. Process for the preparation of a wort according to claim 1, wherein the hydrolyzing substance is constituted by industrial enzymes.

4. Process for the preparation of a wort according to claim 1, wherein the extrusion machine comprises, within a casing at least two screws provided with threads of varying pitch determining, in the direction of advance of the treated material, at least two successive zones, respectively (A, B) of transport and (C) of retarding, the cereal introduced at the upstream end of the machine with a regulated amount of water, being subjected in the transport zone (A, B) to mixing with progressive compression until the obtaining of a viscous paste which can be drawn into the retarding zone (C) where it undergoes a rise in temperature to at least 100° C. and an intense mixing producing the bursting of the starch grains by the combined effects of compression and shearing.

5. Process for the preparation of a wort according to claim 1, wherein after the cooking-extrusion, at the same time mashing of the cereal and of the hydrolyzing substance is carried out, in the same mashing device supplied ssimultaneously, in pre-determined proportions, with the hydrolyzing substance and the previously extruded cereal, the paste prepared then undergoing the saccharification treatment.

6. Process for the preparation of a sweet wort according to claim 4, wherein after passage in the retarding zone C there is introduced into the extrusion machine a portion of the hydrolyzing substance which is mixed with the cereal by passing into a second treatment portion comprising a compression zone (F) and a retarding zone (G), the extruded product emerging from the extruder then undergoing a mashing and progressive cooking with the remainder of the hydrolyzing substance.

7. Process for the preparation of sweet wort according to claim 1, wherein at least a part of the crushing of the cereal is carried out in the extrusion machine in the course of the entrainment of the grains in the screws.

8. Installation for the preparation of sweet wort from at least one cereal and a substance hydrolyzing by contributing enzymes, comprising at least one device for the mashing with water of the cereal and of the hydrolyzing substance and a device for the saccharification of the cereal with the hydrolyzing substance, said installation comprising a cooking-extrusion device for the cereal, placed upstream of the mashing device and constituted by a screw-extrusion machine comprising at least two screws and provided with heating means, in which the cereal undergoes a cooking extrusion under pressure at a temperature above 100° C., the extruded cereal being then mashed and mixed in desired proportion with the hydrolyzing substance in the saccharification device.

9. Installation for the preparation of sweet wort according to claim 8, wherein the mashing device is supplied simultaneously with hydrolyzing substance and with extruded cereal for the production of a mixed paste which can be treated in the saccharification device.

10. Installation for the preparation of sweet wort according to claim 8 or 9, wherein the mashing and saccharification devices are constituted by the same vat in which the two treatments are successively carried out.

11. Installation for the preparation of wort according to claim 8, wherein said at least two screws are provided with threadings of varied pitch determining, in the direction of advance of the material, the transport zone A and of progressive compression B of the cereal and a retarding zone C with compression and intense mixing in which the bursting of the starch grains of the cereal is effected, the casing being provided with heating means extending over the retarding zone C and over at least the downstream portion B of the transport zone.

12. Installation for the preparation of sweet wort according to claim 11, wherein the extrusion machine comprises, downstream of the retarding zone C, a second treatment portion comprising a zone E for the introduction of a portion of the hydrolyzing substance through an orifice, a second zone F of progressive compression and a second retarding zone with compression and intense mixing.

13. Installation for the preparation of wort according to claim 11 or 12, wherein in the retarding zones C and G the screws are provided with threads with reverse pitches in which apertures are formed of a predetermined width for the passage downstream of a controlled flow rate of material.

* * * * *